United States Patent
Fushiwaki et al.

(10) Patent No.: US 10,301,701 B2
(45) Date of Patent: May 28, 2019

(54) HIGH-STRENGTH HOT-DIP GALVANIZED STEEL SHEET AND METHOD FOR PRODUCING SAME

(71) Applicant: JFE STEEL CORPORATION, Tokyo (JP)

(72) Inventors: Yusuke Fushiwaki, Fukuyama (JP); Yoshiyasu Kawasaki, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 229 days.

(21) Appl. No.: 15/118,231

(22) PCT Filed: Feb. 6, 2015

(86) PCT No.: PCT/JP2015/000536
§ 371 (c)(1),
(2) Date: Aug. 11, 2016

(87) PCT Pub. No.: WO2015/125433
PCT Pub. Date: Aug. 27, 2015

(65) Prior Publication Data
US 2017/0166990 A1    Jun. 15, 2017

(30) Foreign Application Priority Data
Feb. 18, 2014  (JP) ................. 2014-028693

(51) Int. Cl.
| | |
|---|---|
| *C23C 2/02* | (2006.01) |
| *C21D 9/46* | (2006.01) |
| *C23C 2/06* | (2006.01) |
| *C23C 2/28* | (2006.01) |
| *C23C 2/40* | (2006.01) |
| *C22C 38/00* | (2006.01) |
| *C22C 38/06* | (2006.01) |
| *C22C 38/60* | (2006.01) |
| *B32B 15/01* | (2006.01) |
| *C22C 38/02* | (2006.01) |
| *C22C 38/04* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/38* | (2006.01) |
| *C21D 6/00* | (2006.01) |
| *C21D 9/56* | (2006.01) |
| *C21D 1/26* | (2006.01) |

(52) U.S. Cl.
CPC .............. *C21D 9/46* (2013.01); *B32B 15/013* (2013.01); *C21D 1/26* (2013.01); *C21D 6/005* (2013.01); *C21D 9/561* (2013.01); *C22C 38/00* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/38* (2013.01); *C22C 38/60* (2013.01); *C23C 2/02* (2013.01); *C23C 2/06* (2013.01); *C23C 2/28* (2013.01); *C23C 2/40* (2013.01); *C21D 2211/004* (2013.01); *C21D 2211/005* (2013.01)

(58) Field of Classification Search
CPC ....................................................... C21D 1/26
See application file for complete search history.

(56) References Cited

U.S. PATENT DOCUMENTS

| | | | |
|---|---|---|---|
| 8,778,097 B2 | 7/2014 | Chin et al. | |
| 8,999,084 B2 | 4/2015 | Fushiwaki et al. | |
| 9,452,792 B2 | 9/2016 | Takagi et al. | |
| 2008/0008901 A1 | 1/2008 | Sugiura et al. | |
| 2011/0083774 A1 | 4/2011 | Jin et al. | |
| 2012/0090737 A1* | 4/2012 | Fushiwaki | C21D 1/26 148/533 |

(Continued)

FOREIGN PATENT DOCUMENTS

| | | |
|---|---|---|
| CA | 2811489 A1 | 4/2012 |
| CN | 102224269 A | 10/2011 |

(Continued)

OTHER PUBLICATIONS

International Search Report and Written Opinion for International Application PCT/JP2015/000536, dated Apr. 28, 2015, 5 pages.
Korean Office Action for Korean Application No. 10-2016-7025583, dated Jun. 17, 2017, including Concise Statement of Relevance of Office Action, 6 pages.
Chinese Office Action for Chinese Application No. 201580009186.X dated Dec. 12, 2017, including Concise Statement of Search Report, 9 pages.
Japanese Office Action with partial English language translation for Application No. JP 2014028693, dated Sep. 15, 2015, 4 pages.
Supplementary European Search Report for Application No. EP 15 75 2400, dated Feb. 1, 2017, 11 pages.
Final Office Action for U.S. Appl. No. 14/771,270, dated Jul. 12, 2017, 34 pages.

(Continued)

*Primary Examiner* — Scott R Kastler
(74) *Attorney, Agent, or Firm* — Ratnerprestia

(57) ABSTRACT

Disclosed is a high-strength hot-dip galvanized steel sheet produced from a steel sheet containing Si and Mn as a base material and a method for producing the same. The method using the following conditions for a heating process for annealing: (1) The rate of temperature rise when the temperature inside an annealing furnace is in a temperature range of from 450° C. to A° C. inclusive (where A is an arbitrary value selected in a range of 500≤A) is 7° C./sec. or more; (2) The maximum steel sheet temperature reached during the annealing is 600° C. or higher and 750° C. or lower; (3) When the temperature of the steel sheet is in a temperature range of from 600° C. to 750° C. inclusive during the annealing, the transit time of the steel sheet is 30 seconds or longer and 10 minutes or shorter, and the dew point of an atmosphere is −45° C. or lower.

6 Claims, No Drawings

(56) References Cited

U.S. PATENT DOCUMENTS

| | | | |
|---|---|---|---|
| 2013/0327452 A1 | 12/2013 | Fushiwaki et al. | |
| 2015/0013851 A1 | 1/2015 | Takahashi | |
| 2015/0044503 A1 | 2/2015 | Fushiwaki et al. | |
| 2016/0002762 A1* | 1/2016 | Fushiwaki | C23C 2/06 428/659 |

FOREIGN PATENT DOCUMENTS

| | | | |
|---|---|---|---|
| CN | 103582714 A | | 2/2014 |
| CN | 104220628 A | | 12/2014 |
| CN | 104508156 A | | 4/2015 |
| EP | 1865085 A1 | | 12/2007 |
| EP | 2381004 A1 | | 10/2011 |
| EP | 2407572 A1 | | 1/2012 |
| EP | 2415896 A1 | | 2/2012 |
| EP | 2708610 A1 | | 3/2014 |
| EP | 2829627 A1 | | 1/2015 |
| JP | 55145122 A | | 11/1980 |
| JP | 05320952 A | | 12/1993 |
| JP | 0610096 A | | 1/1994 |
| JP | 0881748 A | | 3/1996 |
| JP | 2001140021 A | | 5/2001 |
| JP | 2003113441 A | | 4/2003 |
| JP | 2003138345 A | | 5/2003 |
| JP | 2004315960 | | 11/2004 |
| JP | 2004323969 A | | 11/2004 |
| JP | 2004323970 | | 11/2004 |
| JP | 2005248281 A | | 9/2005 |
| JP | 2006045615 A | | 2/2006 |
| JP | 2006233333 | | 9/2006 |
| JP | 2007046146 A | | 2/2007 |
| JP | 2007262464 A | | 10/2007 |
| JP | 2007262464 A | * | 10/2007 |
| JP | 2008024980 | | 2/2008 |
| JP | 2008255442 A | | 10/2008 |
| JP | 2009518541 A | | 5/2009 |
| JP | 2009287114 | | 12/2009 |
| JP | 2010126757 A | | 6/2010 |
| JP | 2010150660 | | 7/2010 |
| JP | 2010255109 A | | 11/2010 |
| JP | 2010255110 A | | 11/2010 |
| JP | 2010255111 | | 11/2010 |
| JP | 2011219778 A | | 11/2011 |
| JP | 4843982 B2 | | 12/2011 |
| JP | 2012072451 A | | 4/2012 |
| JP | 2012072452 A | | 4/2012 |
| JP | 2012251239 A | | 12/2012 |
| JP | 2013124382 A | | 6/2013 |
| JP | 2013136809 | | 7/2013 |
| JP | 2013147681 | | 8/2013 |
| JP | 2013194270 A | | 9/2013 |
| JP | 2014015675 A | | 1/2014 |
| JP | 2014015676 A | | 1/2014 |
| KR | 20090120759 A | | 11/2009 |
| KR | 20120023617 A | | 3/2012 |
| WO | 2007067014 A | | 6/2007 |
| WO | 2009142362 A1 | | 11/2009 |
| WO | 2012042677 A1 | | 4/2012 |
| WO | 2014017010 A1 | | 1/2014 |

OTHER PUBLICATIONS

Korean Office Action for Korean Application No. 10-2016-7025583, dated Nov. 6, 2017, including Concise Statement of Relevance of Office Action, 3 pages.

Chinese Office Action with Concise Statement of Relevance of Application for Chinese Application No. 201580009186.X, dated May 3, 2018, 9 pages.

Non Final Office Action for U.S. Appl. No. 14/771,270, dated May 23, 2018, 21 pages.

Chinese Office Action for Chinese Application No. 201480012075.X, dated Jan. 26, 2017, including Concise Statement of Search Report—9 pages.

Chinese Office Action for Chinese Application No. 201480012075.X, dated Jul. 19, 2016, including Concise Statement of Search Report—21 pages.

Chinese Office Action for Chinese Application No. 201480012075.X, dated Jun. 28, 2017, including Concise Statement of Search Report—7 pages.

Chinese Office Action for Chinese Application No. 201480012075.X, dated Sep. 26, 2017, including Concise Statement of Search Report—4 pages.

European Communication for European Application No. 14 760 083.7, dated Dec. 5, 2017—8 pages.

European Search Report for European Application No. 13 764 796.2, dated Jul. 3, 2015—6 pages.

Extended European Search Report for European Application No. 14 760 083.7, dated Jan. 22, 2016—8 pages.

Final Office Action for U.S. Appl. No. 14/384,298, dated Oct. 17, 2017—7 pages.

International Preliminary Report on Patentability for Application No. PCT/JP2014/001082, dated Sep. 8, 2015—5 pages.

International Search Report for International Application No. PCT/JP2013/001458, dated Jun. 4, 2013—6 pages.

International Search Report for International Application No. PCT/JP2014/001082, dated May 27, 2014—2 pages.

Japanese Office Action for Japanese Application No. 2013042456, dated Sep. 29, 2015—6 pages.

Korean Notice of Allowance for Korean Application No. 10 2015 7027118, dated Dec. 27, 2016—2 pages.

Korean Notice of Allowance for Korean Application No. 10 2014 7027768, dated Oct. 24, 2016—7 pages.

Korean Office Action for Korean Application No. 10 2015 7027118, dated Jun. 21, 2016—7 pages.

Non Final Office Action for U.S. Appl. No. 14/384,298, dated Apr. 2, 2018—8 pages.

Non Final Office Action for U.S. Appl. No. 14/911,795, dated Feb. 13, 2018—8 pages.

Non Final Office Action for U.S. Appl. No. 14/384,298, dated Jun. 23, 2017—17 pages.

Written Opinion for International Application No. PCT/JP2014/001082, dated May 27, 2014—4 pages.

Non Final Office Action for U.S. Appl. No. 14/771,270, dated May 23, 2018, 13 pages.

Final Office Action for U.S. Appl. No. 14/384,298, dated Aug. 13, 2018, 19 pages.

* cited by examiner

HIGH-STRENGTH HOT-DIP GALVANIZED STEEL SHEET AND METHOD FOR PRODUCING SAME

CROSS REFERENCE TO RELATED APPLICATIONS

This is the U.S. National Phase application of PCT/JP2015/000536, filed Feb. 6, 2015 and claims priority to Japanese Patent Application No. 2014-028693, filed Feb. 18, 2014, the disclosures of each of these applications are incorporated herein by reference in their entireties for all purposes.

FIELD OF THE INVENTION

The present invention relates to a high-strength hot-dip galvanized steel sheet that is produced using, as a base material, a high-strength steel sheet containing Si and Mn and is excellent in coating appearance, corrosion resistance, resistance to coating delamination during severe forming, and formability during severe forming. The present invention also relates to a method for producing the high-strength hot-dip galvanized steel sheet.

BACKGROUND OF THE INVENTION

In recent years, surface-treated steel sheets to which anticorrosiveness is imparted, particularly hot-dip galvanized steel sheets and hot-dip galvannealed steel sheets, are widely used as materials of components etc. used in the fields of automobiles, home appliances, construction materials, etc. From the viewpoint of improvements in automotive fuel efficiency and automotive crash safety, there is an increasing demand for a higher-strength automobile body material. Such a material allows a reduction in wall thickness of an automobile body, and the weight of the automobile body itself can thereby be reduced, and its strength can also be increased. Therefore, the application of such a high-strength steel sheet to automobiles is being promoted.

Generally, a steel sheet used as the base material of a hot-dip galvanized steel sheet is a thin steel sheet obtained by subjecting a slab to hot rolling or cold rolling. The high-strength hot-dip galvanized steel sheet is produced by recrystallization annealing in an annealing furnace in a continuous hot-dip galvanizing line (hereafter referred to as a CGL) and hot-dip galvanizing treatment in a coating apparatus in the CGL. A hot-dip galvannealed steel sheet is produced by performing alloying treatment after the hot-dip galvanizing treatment.

Examples of the heating furnace type of the annealing furnace in the CGL include a DFF (direct fired furnace) type, an NOF type (non-oxidizing furnace type), and an all-radiant tube type. In recent years, the construction of CGLs quipped with all-radiant tube type heating furnaces is increasing because of ease of operation, infrequent occurrence of pickup, etc., which make it possible to produce high-quality coated steel sheets at low cost. However, unlike the DFF (direct fired furnace) type and the NOF (non-oxidizing furnace) type, the all-radiant tube-type furnace includes no oxidizing step immediately before annealing. Therefore, the all-radiant tube-type furnace is disadvantageous in terms of ensuring coatability when a steel sheet containing easily oxidizable elements such as Si and Mn is treated using a facility including this heating furnace.

Patent Literature 1 discloses, as a method for producing a hot-dip galvanized steel sheet using as a base material a high-strength steel sheet containing large amounts of Si and Mn, a technique in which annealing is performed at recrystallization temperature to 900° C. and then a coating is formed. Patent Literature 2 discloses a technique in which annealing is performed at 750 to 900° C. and then a coating is formed. Patent Literature 3 discloses a technique in which annealing is performed at 800 to 850° C. and then a coating is formed. When a high-strength steel sheet containing large amounts of Si and Mn is annealed at a high temperature higher than 750° C., Si and Mn in the steel are selectively oxidized and form oxides on the surface of the steel sheet. This may cause deterioration in the adhesion of the coating and the occurrence of defects such as bare spots.

Patent Literature 4 and Patent Literature 5 disclose a technique in which heating temperature in a reducing furnace is specified using a formula represented by the partial pressure of water vapor to increase dew point to thereby internally oxidize the surface layer of base steel. In the techniques described above, since the dew point is controlled over the entire area of the furnace, the dew point is difficult to control, and stable operation is difficult to achieve. When a hot-dip galvannealed steel sheet is produced with the dew point controlled unstably, internal oxides formed in the base steel sheet are distributed non-uniformly. The non-uniform distribution of the internal oxides may cause defects such as uneven coating wettability and uneven alloying in the longitudinal and transversal directions of the steel sheet.

Patent Literature 6 discloses a technique in which not only the concentrations of $H_2O$ and $O_2$, which are oxidizing gases, but also the concentration of $CO_2$ is specified to internally oxidize the surface layer of base steel and suppress external oxidation to thereby improve coating appearance. However, in Patent Literature 6, the presence of the internal oxides causes cracking to occur easily during forming, and the resistance to coating delamination deteriorates. With the technique in Patent Literature 6, deterioration in corrosion resistance also occurs. In addition, $CO_2$ causes pollution of the furnace, carburization of the steel sheet surface, etc., and this may cause a problem in that mechanical properties change.

Recently, high-strength hot-dip galvanized steel sheets and high-strength hot-dip galvannealed steel sheets are increasingly used for portions that are subjected to severe forming, and importance is placed on resistance to coating delamination during severe forming. Specifically, when a coated steel sheet is bent more than 90° to form an acute angle or is subjected to forming by applying an impact to the steel sheet, there is a need to suppress the occurrence of delamination of the coating on the portion subjected to forming.

To meet the above-described characteristics, it is necessary not only to add a large amount of Si to the steel to ensure a desired steel sheet structure but also to control the texture and structure of the surface layer of the base steel immediately below the coating layer in a more sophisticated manner because cracks may start from the surface layer during severe forming. However, it is difficult to achieve the control of the above texture and structure using the conventional techniques. Specifically, with the conventional techniques, it is not possible to produce a hot-dip galvanized steel sheet excellent in resistance to coating delamination during severe forming using, as a base material, a high-strength Si-containing steel sheet in a CGL provided with an all-radiant tube-type heating furnace used as an annealing furnace.

CITATION LIST

Patent Literature

[PTL 1] Japanese Unexamined Patent Application Publication No. 2009-287114
[PTL 2] Japanese Unexamined Patent Application Publication No. 2008-24980
[PTL 3] Japanese Unexamined Patent Application Publication No. 2010-150660
[PTL 4] Japanese Unexamined Patent Application Publication No. 2004-323970
[PTL 5] Japanese Unexamined Patent Application Publication No. 2004-315960
[PTL 6] Japanese Unexamined Patent Application Publication No. 2006-233333

SUMMARY OF THE INVENTION

The present invention has been made in view of the above circumstances. It is an object to provide a high-strength hot-dip galvanized steel sheet that is produced using, as a base material, a steel sheet containing Si and Mn and is excellent in coating appearance, corrosion resistance, resistance to coating delamination during severe forming, and formability during severe forming and to provide a method for producing the high-strength hot-dip galvanized steel sheet.

In the conventional techniques, Fe is subjected to oxidation or internal oxidation on purpose in order to improve coatability. Although this method can improve the coatability, corrosion resistance and formability deteriorate.

Accordingly, the present inventors have contemplated ways to achieve the object using a novel method different from conventional ideas. As a result, the present inventors have found that good coating appearance, higher corrosion resistance, good formability during severe forming, and high resistance to coating delamination during severe forming can be obtained by appropriately controlling the atmosphere and temperature during annealing of the steel sheet to thereby suppress the formation of internal oxidation in the surface layer of the base steel immediately below the coating layer. Specifically, the following (Condition 1) to (Condition 3) are used in a heating process for annealing.

(Condition 1) In the heating process for annealing, the rate of temperature rise when the temperature inside an annealing furnace is in a temperature range of from 450° C. to A° C. inclusive (where A is an arbitrary value selected in a range of 500≤A) is 7° C./sec. or more.

(Condition 2) The maximum steel sheet temperature reached during the annealing is 600° C. or higher and 750° C. or lower.

(Condition 3) When the temperature of the steel sheet is in a temperature range of from 600° C. to 750° C. inclusive during the annealing, the transit time of the steel sheet in the temperature range of from 600° C. to 750° C. inclusive is 30 seconds or longer and 10 minutes or shorter, and the dew point of an atmosphere is −45° C. or lower.

When the above (Condition 1) to (Condition 3) are used, the oxygen potential at the interface between the steel sheet and the atmosphere is reduced, and selective surface diffusion and oxidation (hereafter referred to as surface enrichment) of Si, Mn, etc. are suppressed while internal oxidation is prevented as much as possible.

By controlling the rate of temperature rise, the annealing temperature, and the dew point of the atmosphere in the manner described above, internal oxidation is suppressed, and surface enrichment is suppressed as much as possible. Therefore, a high-strength hot-dip galvanized steel sheet excellent in coating appearance, corrosion resistance, formability during severe forming, and resistance to coating delamination during severe forming can be obtained. Excellent coating appearance means that no bare spots and no unevenness in alloying are found in the appearance.

In the high-strength hot-dip galvanized steel sheet obtained by the above-described method, the formation at least one oxide selected from Fe, Si, Mn, Al, P, B, Nb, Ti, Cr, Mo, Cu, Ni, Sn, Sb, Ta, W, and V oxides (excluding the case where the at least one oxide includes only Fe oxides) is suppressed in a region within 100 μm from the surface of the base steel plate and immediately below the galvanized coating layer. The total amount of oxides formed is less than 0.010 g/m² per side of the base steel sheet. This allows effects such as good coating appearance, a significant improvement in corrosion resistance, achievement of prevention of cracking in the surface layer of the base steel during bending, and high resistance to coating delamination during severe forming to be obtained.

The present invention is based on the above findings and includes the following features.

(1) A method for producing a high-strength hot-dip galvanized steel sheet including a steel sheet and a galvanized coating layer formed on the surface of the steel sheet with a coating weight of 20 to 120 g/m² per side of the steel sheet, the galvanized coating layer being formed after annealing of the steel sheet, the steel sheet containing, by mass %, C: 0.03 to 0.35%, Si: 0.01 to 0.50%, Mn: 3.6 to 8.0%, Al: 0.001 to 1.000%, P: 0.10% or less, and S: 0.010% or less, with the balance being Fe and unavoidable impurities, the method comprising: subjecting the steel sheet to annealing in a continuous galvanizing line, wherein, in a heating process for the annealing, a rate of temperature rise when temperature inside an annealing furnace is in a temperature range of from 450° C. to A° C. inclusive (where A is an arbitrary value selected in a range of 500≤A) is 7° C./sec. or more, wherein maximum steel sheet temperature reached during the annealing is 600° C. or higher and 750° C. or lower, and wherein, when the temperature of the steel sheet is in a temperature range of from 600° C. to 750° C. inclusive during the annealing, transit time of the steel sheet in the temperature range of from 600° C. to 750° C. inclusive is 30 seconds or longer and 10 minutes or shorter, and the dew point of an atmosphere is −45° C. or lower; and then subjecting the steel sheet subjected to the annealing to hot-dip galvanizing treatment.

(2) The method for producing a high-strength hot-dip galvanized steel according to (1), wherein the steel sheet further contains in a chemical composition thereof, by mass %, at least one element selected from B: 0.001 to 0.005%, Nb: 0.005 to 0.050%, Ti: 0.005 to 0.050%, Cr: 0.001 to 1.000%, Mo: 0.05 to 1.00%, Cu: 0.05 to 1.00%, Ni: 0.05 to 1.00%, Sn: 0.001 to 0.20%, Sb: 0.001 to 0.20%, Ta: 0.001 to 0.10%, W: 0.001 to 0.10%, and V: 0.001 to 0.10%.

(3) The method for producing a high-strength hot-dip galvanized steel according to (1) or (2), further comprising, after the hot-dip galvanizing treatment, subjecting the steel sheet to alloying treatment by heating the steel sheet to a temperature of 450° C. or higher and 600° C. or lower to adjust the content of Fe in the coating layer within a range of 8 to 14% by mass.

(4) A high-strength hot-dip galvanized steel sheet produced by the method for producing a high-strength hot-dip galvanized steel sheet according to any of (1) to (3), comprising: a base steel sheet and the galvanized coating layer formed on the base steel sheet, wherein the base steel sheet has the chemical composition according to (1) or (2), and the total amount of at least one oxide selected from Fe, Si, Mn, Al, P, B, Nb, Ti, Cr, Mo, Cu, Ni, Sn, Sb, Ta, W, and V oxides (excluding the case where the at least one oxide includes only Fe oxides) that is present in a region within 100 μm from a surface of the base steel sheet and immediately below the galvanized coating layer is less than 0.010 g/m² per side of the base steel sheet.

In the present invention, the term "high strength" means a tensile strength (TS) of 980 MPa or more.

According to the present invention, a high-strength hot-dip galvanized steel sheet excellent in coating appearance, corrosion resistance, resistance to coating delamination during severe forming, and formability during severe forming can be obtained.

DETAILED DESCRIPTION OF EMBODIMENTS OF THE INVENTION

Embodiments of the present invention will be described. However, the present invention is not limited to the following embodiments.

In a high-strength hot-dip galvanized steel sheet containing large amounts of Si and Mn in the steel, there is a need to suppress as much as possible internal oxidation in the surface layer of the base steel immediately below the coating layer in order to achieve satisfactory corrosion resistance and resistance to coating delamination during severe forming, because cracks may start from the surface layer during severe forming.

Coatability can be improved by oxidizing Fe or promoting internal oxidation of Si and Mn. However, these methods cause deterioration of corrosion resistance and formability. Therefore, it is necessary to use a method other than the method including oxidizing Fe and the method including promoting internal oxidation of Si and Mn, in order to suppress internal oxidation to thereby improve corrosion resistance and formability while good coatability is maintained. In the present invention, as a result of studies, oxygen potential during annealing of the steel is reduced in order to ensure coatability, and the activities of easily oxidizable elements such as Si and Mn in the surface layer of the base steel are reduced. External oxidation of these elements is thereby suppressed, and the coatability is improved. By reducing the oxygen potential during annealing of the steel sheet, internal oxidation formed in the surface layer of the base steel is suppressed, and the corrosion resistance and the formability are thereby improved.

Specifically, the following (Condition 1) to (Condition 3) are used in a heating process for annealing.

(Condition 1) In the heating process for annealing, the rate of temperature rise when the temperature inside an annealing furnace is in a temperature range of from 450° C. to A° C. inclusive (where A is an arbitrary value selected in a range of 500≤A) is 7° C./sec. or more.

(Condition 2) The maximum steel sheet temperature reached during the annealing is 600° C. or higher and 750° C. or lower.

(Condition 3) When the temperature of the steel sheet is in a temperature range of from 600° C. to 750° C. inclusive during the annealing, the transit time of the steel sheet in the temperature range of from 600° C. to 750° C. inclusive is 30 seconds or longer and 10 minutes or shorter, and the dew point of an atmosphere is −45° C. or lower.

By controlling the annealing conditions as described above, the oxygen potential at the interface between the steel sheet and the atmosphere can be reduced. By reducing the oxygen potential, internal oxidation can be suppressed, and selective surface diffusion and surface enrichment of Si and Mn can also be suppressed. Therefore, a high-strength hot-dip galvanized steel sheet having a good appearance with no bare spots, excellent in formability, and having higher corrosion resistance and high resistance to coating delamination during severe forming can be obtained.

First, a method for producing the steel sheet to be annealed will be described. No particular limitation is imposed on the method for producing the steel sheet. For example, a method for producing a hot-rolled sheet by subjecting steel to hot-rolling, a method for producing a cold-rolled sheet by subjecting steel to hot rolling and then subjecting the hot-rolled steel to cold rolling, or a method for producing a cold-rolled sheet by subjecting steel to hot rolling, then pickling the resultant steel, and subjecting the pickled steel to cold rolling may be used. The thus-obtained hot-rolled sheet or cold-rolled sheet can be used as the steel sheet to be annealed. No particular limitation is imposed on the thickness of the hot-rolled sheet and cold-rolled sheet. Preferably, the thickness is 0.3 to 5.0 mm.

No particular limitation is imposed on the hot-rolling conditions and the pickling conditions when the steel sheet is produced, and these conditions may be appropriately set. Preferably, the cold rolling is performed at a rolling reduction of 40% or more and 80% or less. If the rolling reduction is less than 40%, a reduction in recrystallization temperature occurs, and mechanical properties tend to deteriorate. If the rolling reduction exceeds 80%, the cost of rolling increases because of the high strength of the steel sheet. In addition, the degree of surface enrichment during annealing increases, and this may cause deterioration in coatability.

Next, the conditions when the steel sheet is annealed will be described. The annealing can be performed using a general continuous galvanizing line. An annealing furnace included in the general continuous galvanizing line has a heating zone in an upstream stage and a soaking zone in a downstream stage. Generally, the steel sheet is heated to a prescribed temperature in the heating zone in the upstream stage and held in the soaking zone in the downstream stage under the conditions of a prescribed temperature for a prescribed time.

As described in (Condition 1) above, in the heating process for annealing, the rate of temperature rise when the temperature inside the annealing furnace is in a temperature range of from 450° C. to A° C. inclusive (where A is an arbitrary value selected in a range of 500≤A) is 7° C./sec. or more. Generally, the heating is performed in the heating zone. The temperature in the above temperature range is the temperature of the steel sheet (steel sheet temperature) that is being annealed. The steel sheet temperature is a value measured by thermometers placed at roll positions for each pass in the annealing furnace. Examples of the thermometer include a multiple reflection thermometer and a radiation thermometer. No particular limitation is imposed on the type of thermometer.

The reason that the rate of temperature rise is controlled in the temperature range of 450° C. or higher is as follows. In the temperature range of lower than 450° C., surface enrichment and internal oxidation do not occur to the extent that the occurrence of bare spots, deterioration in corrosion resistance, deterioration in resistance to coating delamination, etc. cause problems. Therefore, the rate of temperature rise is controlled in the temperature range of 450° C. or higher, which is the temperature range in which the effects of the present invention are achieved.

The reason that the rate of temperature rise is controlled in the temperature range of A° C. or lower (where A is an arbitrary value selected in the range of 500≤A) is as follows. First, if the upper limit of the temperature range in which the rate of temperature rise is controlled is lower than 500° C., the time during which the rate of temperature rise is controlled to 7° C./sec. or more is short, and the effects of the present invention are not sufficiently obtained. Therefore, A is 500° C. or higher. If the upper limit of the temperature range in which the rate of temperature rise is controlled is higher than 600° C., the effects of the present invention are obtained with no problems, but this is disadvantageous in terms of increase in cost of the equipment of the annealing furnace (e.g., an additional IH heater). Therefore, the upper limit of the temperature range is preferably 600° C. or lower.

The reason that the rate of temperature rise within the above temperature range is 7° C./sec. or more is as follows. The effect of suppressing surface enrichment becomes noticeable when the rate of temperature rise is 7° C./sec. or more. No particular limitation is imposed on the upper limit of the rate of temperature rise. However, if the rate of temperature rise is 500° C./sec. or more, the effect is saturated, and this is disadvantageous in terms of cost. Therefore, the rate of temperature rise is preferably 500° C./sec. or less. The rate of temperature rise can be set to 7° C./sec. or more by, for example, disposing an induction heater in the annealing furnace in which the steel sheet temperature is 450° C. or higher and A° C. or lower. In the present invention, "sec." in the unit of the rate of temperature rise stands for second.

As described in (Condition 2) above, the maximum steel sheet temperature reached during the annealing is 600° C. or higher and 750° C. or lower. The maximum steel sheet temperature is a temperature higher than the maximum temperature A° C. achieved by the heating in the heating process, except for the case in which A° C. is the same as the maximum steel sheet temperature. The maximum steel sheet temperature is a maximum value during the annealing. In this case, the temperature is measured using the same method as the method for measuring the steel sheet temperature described above.

The reason that the maximum steel sheet temperature reached in the annealing furnace is 600° C. or higher and 750° C. or lower is as follows. If the maximum steel sheet temperature is lower than 600° C., although surface enrichment and internal oxidation do not occur to the extent that the occurrence of bare spots, deterioration of corrosion resistance, deterioration of resistance to coating delamination, etc. cause problems, the effects of the present invention are not obtained sufficiently. If the maximum steel sheet temperature is lower than 600° C., good material properties are not obtained. Therefore, in embodiments of the present invention, the maximum steel sheet temperature is set to 600° C. or higher. If the maximum steel sheet temperature exceeds 750° C., significant surface enrichment occurs, and the occurrence of bare spots, deterioration of corrosion resistance, deterioration of resistance to coating delamination, etc. become significant. In terms of material properties, the effect of balancing the strength (TS) and ductility (El) is saturated when the maximum steel sheet temperature exceeds 750° C. Therefore, the maximum steel sheet temperature is 600° C. or higher and 750° C. or lower.

As described above in (Condition 3), when the temperature of the steel sheet is in a temperature range of from 600° C. to 750° C. inclusive during the annealing, the transit time of the steel sheet in the temperature range of from 600° C. to 750° C. inclusive is 30 seconds or longer and 10 minutes or shorter, and the dew point of an atmosphere is −45° C. or lower.

If the transit time of the steel sheet is shorter than 30 seconds, the intended material properties (TS and El) are not obtained. If the transit time of the steel sheet is longer than 10 minutes, the effect of balancing the strength and the ductility is saturated.

When the dew point of the atmosphere during the annealing when the steel sheet temperature is in the temperature range of from 600° C. to 750° C. inclusive is −45° C. or lower, the effect of suppressing surface enrichment is observed. The lower limit of the dew point is not particularly specified. However, if the dew point is −80° C. or lower, the effect is saturated, and this is cost disadvantageous. Therefore, the dew point is desirably −80° C. or higher.

No particular limitation is imposed on the dew point in other temperature ranges.

The use of the above (Condition 1) to (Condition 3) during the annealing is important in order to obtain a high-strength hot-dip galvanized steel sheet excellent in appearance, corrosion resistance, resistance to coating delamination during severe forming, and formability during severe forming. Annealing conditions other than the above essential conditions are as follows.

In the present invention, no particular limitation is imposed on the conditions of the soaking temperature and soaking time in the soaking zone, and these may be set appropriately. The soaking temperature may be the maximum steel sheet temperature described above or may be a temperature lower than the maximum steel sheet temperature.

In the continuous annealing described above, no particular limitation is imposed on the atmosphere gas, so long as the effects of the present invention are not impaired. Generally, the atmosphere gas is composed of hydrogen gas, nitrogen gas, and unavoidable impurity gases. The atmosphere gas may contain other gases (such as $H_2O$, $CO_2$, and CO), so long as the effects of the present invention are not impaired.

The surface of the steel sheet after annealing is subjected to coating treatment. The coating treatment is also performed in the continuous galvanizing line. No particular limitation is imposed on the conditions of the coating treatment except for the conditions of the coating weight, and these conditions may be set appropriately.

In embodiments of the present invention, the conditions under which the coating weight per side in the coating treatment is 20 to 120 $g/m^2$ are used. If the coating weight is less than 20 $g/m^2$, it is difficult to ensure corrosion resistance. If the coating weight exceeds 120 $g/m^2$, the resistance to coating delamination deteriorates.

Alloying treatment may be performed after the coating treatment. When the alloying treatment is performed after the coating treatment, the steel sheet subjected to the coating treatment is heated to 450° C. or higher and 600° C. or lower. In this case, it is preferable to perform the heating such that the content of Fe in the coating layer is 8 to 14% by mass. If the content of Fe is less than 8%, uneven alloying occurs, and flaking properties deteriorate. If the content of Fe exceeds 14%, the resistance to coating delamination deteriorates.

High-strength hot-dip galvanized steel sheets produced by the method of the present invention include both a high-strength hot-dip galvanized steel sheet not subjected to the alloying treatment and a high-strength hot-dip galvannealed steel sheet subjected to the alloying treatment.

As described above, the feature of the present invention is the annealing conditions of the steel sheet. Next, embodiments of the steel sheet to be annealed will be described. In the following description of the chemical composition, "%" means "% by mass."

C: 0.03 to 0.35%

C allows martensite etc. to be formed in the structure of the steel to thereby improve formability. To achieve this, the content of C must be 0.03% or more. If the content of C exceeds 0.35%, weldability deteriorates. Therefore, the content of C is 0.03% or more and 0.35% or less.

Si: 0.01 to 0.50%

Silicon is an element effective in strengthening the steel to thereby obtain good material properties. However, Si is an easily oxidizable element and is disadvantageous for coatability. From this point of view, the amount of this element added is reduced as much as possible. However, Si is unavoidably contained in the steel in an amount of about 0.01%, and a further reduction in the content of Si leads to an increase in cost. Therefore, the lower limit of the content of Si is 0.01%. If the content of Si exceeds 0.50%, the resistance to coating delamination during severe forming is not easily improved. Therefore, the amount of Si is 0.01% or more and 0.50% or less. One feature of the present invention is that, even when the content of Si is large, a high-strength hot-dip galvanized steel sheet having good properties can be obtained.

Mn: 3.6 to 8.0%

Mn is an element effective in strengthening the steel. To ensure mechanical properties and strength, it is necessary that the content of Mn be 3.6% or more. If the content of Mn exceeds 8.0%, it is difficult to ensure weldability and the adhesion of the coating and to ensure the balance between the strength and ductility. Therefore, the amount of Mn is 3.6% or more and 8.0% or less.

Al: 0.001 to 1.000%

Al is added for the purpose of deoxidizing molten steel. If the content of Al is less than 0.001%, this purpose is not achieved. The effect of deoxidizing the molten steel is obtained when the content of Al is 0.001% or more. If the content of Al exceeds 1.000%, the cost increases. Therefore, the amount of Al is 0.001% or more and 1.000% or less.

P: 0.10% or less

P is one of elements unavoidably contained. In the present invention, the steel sheet may not contain P. To reduce the content of P to less than 0.005%, the cost may increase. It is therefore desirable that the content of P is 0.005% or more. If P is contained in an amount of more than 0.10%, the weldability deteriorates. In addition, surface quality deteriorates. When no alloying treatment is performed, the adhesion of the coating deteriorates. When the alloying treatment is performed, the desired degree of alloying cannot be obtained unless the alloying treatment temperature is increased. If the alloying treatment temperature is increased in order to obtain the desired degree of alloying, the ductility deteriorates, and the adhesion of the alloyed coating deteriorates. Therefore, if the content of P exceeds 0.10%, the desired degree of alloying, good ductility, and the alloyed coating cannot be achieved simultaneously. Therefore, the amount of P is 0.10% or less, and its lower limit is desirably 0.005% or more.

S: 0.010% or less

S is one of the elements unavoidably contained and may not be contained. The lower limit of the content of S is not specified. If the content of S is large, the weldability deteriorates. Therefore, the content of S is 0.010% or less.

To improve the balance between the strength and ductility of a high-strength steel sheet produced by the production method of the present invention, the steel sheet to be subjected to continuous annealing may optionally contain at least one element selected from B: 0.001 to 0.005%, Nb: 0.005 to 0.050%, Ti: 0.005 to 0.050%, Cr: 0.001 to 1.000%, Mo: 0.05 to 1.00%, Cu: 0.05 to 1.00%, Ni: 0.05 to 1.00%, Sn: 0.001 to 0.20%, Sb: 0.001 to 0.20%, Ta: 0.001 to 0.10%, W: 0.001 to 0.10%, and V: 0.001 to 0.10%. The reasons for the limitations on the appropriate amounts of these elements contained are as follows.

B: 0.001 to 0.005%

If the content of B is less than 0.001%, the effect of promoting hardening is unlikely to be achieved. If the content of B exceeds 0.005%, the adhesion of the coating may deteriorate. Therefore, when B is contained, the amount of B is preferably 0.001% or more and 0.005% or less.

Nb: 0.005 to 0.050%

If the content of Nb is less than 0.005%, the effect of controlling the strength and the effect of improving the adhesion of the coating when Nb is added in combination with Mo are unlikely to be achieved. If the content of Nb exceeds 0.050%, the cost increases. Therefore, when Nb is contained, the amount of Nb is 0.005% or more and 0.050% or less.

Ti: 0.005 to 0.050%

If the content of Ti is less than 0.005%, the effect of controlling the strength is unlikely to be achieved. If the content of Ti exceeds 0.050%, the adhesion of the coating may deteriorate. Therefore, when Ti is contained, the amount of Ti is preferably 0.005% or more and 0.050% or less.

Cr: 0.001 to 1.000%

If the content of Cr is less than 0.001%, the hardening effect is unlikely to be achieved. If the content of Cr exceeds 1.000%, surface enrichment of Cr occurs, and therefore the adhesion of the coating and the weldability deteriorate. Therefore, when Cr is contained, the amount of Cr is preferably 0.001% or more and 1.000% or less.

Mo: 0.05 to 1.00%

If the content of Mo is less than 0.05%, the effect of controlling the strength and the effect of improving the adhesion of the coating when Mo is added in combination with Nb, Ni, or Cu are unlikely to be achieved. If the content of Mo exceeds 1.00%, the cost increases. Therefore, when Mo is contained, the amount of Mo is preferably 0.05% or more and 1.00% or less.

Cu: 0.05 to 1.00%

If the content of Cu is less than 0.05%, the effect of promoting the formation of a retained γ phase and the effect of improving the adhesion of the coating when Cu is added in combination with Ni or Mo are unlikely to be achieved. If the content of Cu exceeds 1.00%, the cost increases. Therefore, when Cu is contained, the amount of Cu is preferably 0.05% or more and 1.00% or less.

Ni: 0.05 to 1.00%

If the content of Ni is less than 0.05%, the effect of promoting the formation of a retained γ phase and the effect of improving the adhesion of the coating when Ni is added in combination with Cu or Mo are unlikely to be achieved. If the content of Ni exceeds 1.00%, the cost increases. Therefore, when Ni is contained, the amount of Ni is preferably 0.05% or more and 1.00% or less.

Sn: 0.001 to 0.20%, Sb: 0.001 to 0.20%

Sn and Sb may be contained in order to suppress nitriding and oxidation of the surface of the steel sheet or decarburization caused by oxidation in a region several tens of micrometers from the surface of the steel sheet. By suppressing nitriding and oxidation, a reduction in the amount of martensite generated on the surface of the steel sheet is prevented, and the fatigue properties and surface quality of the high-strength steel sheet obtained are improved. When Sn or Sb is contained in order to suppress nitriding and oxidation, its amount is preferably 0.001% or more. If the amount exceeds 0.20%, toughness deteriorates. Therefore, the contents of Sn and Sb are preferably 0.20% or less.

Ta: 0.001 to 0.10%

Ta forms a carbide and a carbonitride with C and N and contributes to an increase in strength, as do Nb and Ti. In addition, Ta contributes to an increase in yield ratio (YR). From these points of view, when Ta is contained, the area of grain boundaries increases, and the amount of C segregated on the boundaries thereby increases, so that a large bake hardening amount (BH amount) can be obtained. From these points of view, Ta may be contained in an amount of 0.001% or more. If the content of Ta exceeds 0.10%, the cost of the raw material increases. In addition, Ta may prevent the formation of martensite during a cooling process after annealing, as do Nb and Ti. TaC precipitated in a hot-rolled sheet causes an increase in deformation resistance during cold rolling, and this may cause difficulty in stable actual production. Therefore, when Ta is contained, its content is preferably 0.10% or less.

W: 0.001 to 0.10%, V: 0.001 to 0.10%

When W or V is added in combination with Si and Mn, the formation of a Γ phase is suppressed, and the effect of improving the adhesion of the coating is achieved. This effect is achieved when any of the elements, W and V, is contained in an amount of 0.001% or more. If one of the elements is contained in an amount of more than 0.10%, the effect is saturated, and the effect corresponding to the content is not expected, and this is economically disadvantageous.

Fe and Unavoidable Impurities

The balance other than the components described above is Fe and unavoidable impurities. Examples of the unavoidable impurities include O. O is a representative unavoidable impurity that is mixed unavoidably. No particular limitation is imposed on the content of an unavoidable impurity. The allowable content of an unavoidable impurity depends on the type of the unavoidable impurity. When the unavoidable impurity is O, an O content of 0.005% or less does not cause any problem.

By controlling the annealing conditions etc. of the steel sheet having the above-described chemical composition, a high-strength hot-dip galvanized steel sheet excellent in appearance, corrosion resistance, resistance to coating delamination during severe forming, and formability is obtained. This high-strength hot-dip galvanized steel sheet will be described.

The high-strength hot-dip galvanized steel sheet produced by the method described above will be described. A feature of the high-strength hot-dip galvanized steel sheet of the present invention is the structure of the surface layer of the base steel sheet immediately below the coating layer. Specifically, in the high-strength hot-dip galvanized steel sheet of an embodiment of the present invention, the total amount of at least one oxide selected from Fe, Si, Mn, Al, P, B, Nb, Ti, Cr, Mo, Cu, Ni, Sn, Sb, Ta, W, and V oxides (excluding the case where the at least one oxide includes only Fe oxides) that is present in a region within 100 μm from the surface of the base steel plate and immediately below the galvanized coating layer is less than 0.010 g/m$^2$ per side of the base steel sheet. The total amount of Fe, Si, Mn, Al, P, B, Nb, Ti, Cr, Mo, Cu, Ni, Sn, Sb, Ta, W, and V oxides formed (excluding the case where only Fe oxides are formed) may be less than 0.010 g/m$^2$ per side. In the present invention, the amount of oxides is measured using a method described in Examples.

To allow a hot-dip galvanized steel sheet containing large amounts of Si and Mn in the steel to satisfy corrosion resistance and resistance to coating delamination during severe forming, it is necessary to suppress as much as possible internal oxidation in the surface layer of the base steel immediately below the coating layer because corrosion and cracking during severe forming may start from the surface layer. Accordingly, in the present invention, oxygen potential during annealing is reduced in order to ensure coatability. By reducing the oxygen potential, the activities of easily oxidizable elements such as Si and Mn in the surface layer of the base steel are reduced. By reducing the activities, external oxidation of these elements is suppressed, and the coatability is thereby improved. Under the annealing conditions described above, internal oxidation formed in the surface layer of the base steel is also suppressed, and the corrosion resistance and the formability during severe forming are improved. This effect is achieved by reducing the total amount of at least one oxide selected from Fe, Si, Mn, Al, P, B, Nb, Ti, Cr, Mo, Cu, Ni, Sn, Sb, Ta, W, and V oxides (excluding the case where the at least one oxide includes only Fe oxides) that is present in a region within 100 μm from the surface of the base steel plate to less than 0.010 g/m$^2$ per side of the base steel sheet. If the total amount of oxides formed (hereinafter referred to as an internal oxidation amount) is 0.010 g/m$^2$ or more, corrosion resistance and formability deteriorate. Even when the internal oxidation amount is reduced to less than 0.0001 g/m$^2$, the effect of improving the corrosion resistance and formability during severe forming is saturated. Therefore, the lower limit of the internal oxidation amount is preferably 0.0001·g/m$^2$ or more.

In the present invention, in addition to the above, the structure of the base steel in which Si and Mn-based composite oxides grow is preferably a soft and easily formable ferrite phase, in order to improve the resistance to coating delamination.

EXAMPLES

The present invention will be specifically described by way of Examples.

Hot-rolled steel sheets having steel compositions shown in Table 1 were pickled to remove black scales and then cold-rolled to obtain cold-rolled steel sheets having a thickness of 1.0 mm. Some of the hot-rolled steel sheets were not subjected to cold rolling and used as hot-rolled steel sheets (thickness: 2 mm) with the black scales removed.

TABLE 1

| Steel symbol | C | Si | Mn | Al | P | S | Cr | Mo | B | Nb | Cu | Ni | Ti | Sn | Sb | Ta | W | V (mass %) |
|---|---|---|---|---|---|---|---|---|---|---|---|---|---|---|---|---|---|---|
| A | 0.12 | 0.03 | 4.5 | 0.03 | 0.01 | 0.004 | — | — | — | — | — | — | — | — | — | — | — | — |
| B | 0.03 | 0.03 | 4.6 | 0.03 | 0.01 | 0.004 | — | — | — | — | — | — | — | — | — | — | — | — |
| C | 0.35 | 0.03 | 4.7 | 0.02 | 0.01 | 0.004 | — | — | — | — | — | — | — | — | — | — | — | — |
| D | 0.12 | 0.10 | 4.5 | 0.03 | 0.01 | 0.004 | — | — | — | — | — | — | — | — | — | — | — | — |
| E | 0.13 | 0.30 | 4.7 | 0.04 | 0.01 | 0.004 | — | — | — | — | — | — | — | — | — | — | — | — |

TABLE 1-continued

| Steel symbol | C | Si | Mn | Al | P | S | Cr | Mo | B | Nb | Cu | Ni | Ti | Sn | Sb | Ta | W | (mass %) V |
|---|---|---|---|---|---|---|---|---|---|---|---|---|---|---|---|---|---|---|
| F | 0.12 | 0.50 | 4.6 | 0.03 | 0.01 | 0.004 | — | — | — | — | — | — | — | — | — | — | — | — |
| G | 0.12 | 0.03 | 3.6 | 0.02 | 0.01 | 0.004 | — | — | — | — | — | — | — | — | — | — | — | — |
| H | 0.13 | 0.03 | 6.3 | 0.03 | 0.01 | 0.004 | — | — | — | — | — | — | — | — | — | — | — | — |
| I | 0.12 | 0.03 | 8.0 | 0.02 | 0.01 | 0.004 | — | — | — | — | — | — | — | — | — | — | — | — |
| J | 0.13 | 0.03 | 4.5 | 0.30 | 0.01 | 0.004 | — | — | — | — | — | — | — | — | — | — | — | — |
| K | 0.12 | 0.03 | 4.6 | 1.00 | 0.01 | 0.004 | — | — | — | — | — | — | — | — | — | — | — | — |
| L | 0.12 | 0.03 | 4.7 | 0.03 | 0.05 | 0.004 | — | — | — | — | — | — | — | — | — | — | — | — |
| M | 0.12 | 0.03 | 4.5 | 0.02 | 0.10 | 0.004 | — | — | — | — | — | — | — | — | — | — | — | — |
| N | 0.13 | 0.02 | 4.7 | 0.03 | 0.01 | 0.009 | — | — | — | — | — | — | — | — | — | — | — | — |
| O | 0.12 | 0.03 | 4.6 | 0.02 | 0.01 | 0.004 | 0.8 | — | — | — | — | — | — | — | — | — | — | — |
| P | 0.13 | 0.03 | 4.5 | 0.03 | 0.01 | 0.004 | — | 0.1 | — | — | — | — | — | — | — | — | — | — |
| Q | 0.13 | 0.02 | 4.7 | 0.03 | 0.01 | 0.004 | — | — | 0.003 | — | — | — | — | — | — | — | — | — |
| R | 0.12 | 0.03 | 4.5 | 0.05 | 0.01 | 0.004 | — | — | 0.001 | 0.03 | — | — | — | — | — | — | — | — |
| S | 0.13 | 0.03 | 4.5 | 0.03 | 0.01 | 0.004 | — | 0.1 | — | — | 0.1 | 0.2 | — | — | — | — | — | — |
| T | 0.12 | 0.02 | 4.7 | 0.04 | 0.01 | 0.004 | — | — | 0.001 | — | — | — | 0.020 | — | — | — | — | — |
| U | 0.13 | 0.03 | 4.6 | 0.03 | 0.01 | 0.004 | — | — | — | — | — | — | 0.050 | — | — | — | — | — |
| V | 0.12 | 0.03 | 4.6 | 0.03 | 0.01 | 0.004 | — | — | — | — | — | — | — | 0.05 | — | — | — | — |
| W | 0.13 | 0.03 | 4.5 | 0.02 | 0.01 | 0.004 | — | — | — | — | — | — | — | — | 0.05 | — | — | — |
| X | 0.12 | 0.02 | 4.4 | 0.03 | 0.01 | 0.004 | — | — | — | — | — | — | — | — | — | 0.01 | — | — |
| Y | 0.12 | 0.03 | 4.5 | 0.02 | 0.01 | 0.004 | — | — | — | — | — | — | — | — | — | — | 0.01 | — |
| Z | 0.13 | 0.02 | 4.7 | 0.03 | 0.01 | 0.004 | — | — | — | — | — | — | — | — | — | — | — | 0.01 |
| <u>XA</u> | <u>0.02</u> | 0.02 | 4.6 | 0.03 | 0.01 | 0.004 | — | — | — | — | — | — | — | — | — | — | — | — |
| <u>XB</u> | <u>0.36</u> | 0.03 | 4.7 | 002 | 0.01 | 0.004 | — | — | — | — | — | — | — | — | — | — | — | — |
| <u>XC</u> | 0.12 | <u>0.60</u> | 4.5 | 0.03 | 0.01 | 0.004 | — | — | — | — | — | — | — | — | — | — | — | — |
| <u>XD</u> | 0.13 | 0.03 | <u>3.5</u> | 0.03 | 0.01 | 0.004 | — | — | — | — | — | — | — | — | — | — | — | — |
| <u>XE</u> | 0.12 | 0.03 | 4.6 | <u>1.18</u> | 0.01 | 0.004 | — | — | — | — | — | — | — | — | — | — | — | — |
| <u>XF</u> | 0.13 | 0.02 | 4.5 | 0.03 | <u>0.12</u> | 0.004 | — | — | — | — | — | — | — | — | — | — | — | — |
| <u>XG</u> | 0.12 | 0.02 | 4.7 | 0.04 | 0.01 | <u>0.020</u> | — | — | — | — | — | — | — | — | — | — | — | — |

Underlined items are outside the scope of the present invention

Next, each of the above-obtained cold-rolled steel sheets and hot-rolled steel sheets was fed to a CGL provided with an all-radiant tube-type heating furnace used as an annealing furnace. In the CGL, while the heating rate, dew point, transit time of the steel sheet, and maximum steel sheet temperature in prescribed temperature ranges in the annealing furnace were controlled as shown in Tables 2 and 3, the steel sheet was fed through the annealing furnace, heated in the heating zone, soaked in the soaking zone, and thereby annealed. To control the dew point of the atmosphere during annealing, a pipe arrangement through which humidified $N_2$ gas flowed was connected to the annealing furnace. The $N_2$ gas was humidified by heating a water tank disposed in a space filled with the $N_2$ gas. $H_2$ gas was introduced and mixed into the humidified $N_2$ gas, and the gas mixture was introduced into the furnace to thereby control the dew point of the atmosphere.

After the annealing, hot-dip galvanizing treatment was performed in an Al-containing Zn bath at 460° C. When a GA (a high-strength hot-dip galvannealed steel sheet) was produced, a Zn bath containing 0.14% by mass of Al was used. When a GI (a high-strength hot-dip galvanized steel sheet) was produced, a Zn bath containing 0.18% by mass of Al was used. The coating weight was controlled by gas wiping such that a galvanized coating layer with a coating weight of 20 to 120 g/m² per side was formed. The temperature of the alloying treatment was as shown in Tables 2 and 3, and the alloying temperature and time were controlled such that the content of Fe in the coating layer was one of values shown in Tables 2 and 3.

The appearance (coating appearance), corrosion resistance, resistance to coating delamination during severe forming, formability during severe forming of each of the above-obtained hot-dip galvanized steel sheets (GAs and GIs) were examined. In addition, the amount of oxides (internal oxidation amount) present in a region within 100 μm from the surface of the base steel sheet and immediately below the coating layer was measured. The measurement methods and evaluation criteria are shown below.

<Appearance (Coating Appearance)>

The appearance was evaluated by visual inspection. When appearance defects such as bare spots and uneven alloying were not found, this appearance received a "good" rating (symbol: A). When appearance defects such as bare spots and uneven alloying were found, this appearance received a "poor" rating (symbol: C).

<Resistance to Coating Delamination>

In a GA-type high-strength hot-dip galvanized steel sheet, the coating on a bent portion formed by bending the steel sheet more than 90° to form an acute angle is required to resist delamination. In the Examples, a cellophane tape (registered trademark) was pressed against a 120° bent portion to transfer delaminated pieces to the cellophane tape (registered trademark), and the amount of the delaminated pieces on the cellophane tape (registered trademark) was determined from the number of Zn counts by X-ray fluorescence spectrometry. The diameter of a mask used was 30 mm. The accelerating voltage of the fluorescent X-rays was 50 kV, and the accelerating current was 50 mA. The time of the measurement was 20 seconds. The resistance to coating delamination was evaluated according to the following criteria. Specifically, the resistance to coating delamination with rank 1, 2, 3, or 4 was evaluated as "good (symbol: AA or A)," and the resistance to coating delamination with rank 5 was evaluated as "poor (symbol: C)." The symbols AA and A indicate that coating delamination during severe forming causes no problems. The symbol C indicates performance that is not suitable for practical use.

| Number of X-ray fluorescence Zn counts | Rank |
|---|---|
| 0 to less than 500: | 1 (good) AA |
| 500 or more to less than 1,000: | 2 A |

| Number of X-ray fluorescence Zn counts | Rank |
|---|---|
| 1,000 or more to less than 2,000: | 3 A |
| 2,000 or more to less than 3,000: | 4 A |
| 3,000 or more: | 5 (poor) C |

It is necessary for the GI-type high-strength hot-dip galvanized steel sheets to have resistance to coating delamination in an impact test. A ball impact test was performed. A tape on the tested portion was peeled off, and the occurrence of delamination of the coating layer was inspected visually. The ball impact conditions are a ball weight of 1,000 g and a drop height of 100 cm.
  A: No delamination of coating layer
  C: Coating layer delaminated <Corrosion Resistance>

Each of the hot-dip galvanized steel sheets (GAs and GIs) with dimensions of 70 mm×150 mm was subjected to a salt spray test for 3 days according to JIS Z 2371 (2000). Then the steel sheet was washed with chromic acid (concentration: 200 g/L, 80° C.) for 1 minute to remove corrosion products, and the corrosion weight loss (g/m²·day) of the coating per side before and after the test was measured by a gravimetric method and evaluated using the following criteria.
  A (good): Less than 20 g/m²·day
  C (poor): 20 g/m²·day or more <Formability>

As for the formability, a JIS No. 5 tensile test piece was taken from each sample in a direction 90° from the rolling direction and subjected to a tensile test at a constant cross head speed of 10 mm/min according to the specifications of JIS Z 2241 to measure tensile strength TS (MPa) and elongation El (%). A test piece with TS×El≥24,000 was evaluated as good, and a test piece with TS×El<24,000 was evaluated as poor.

<Internal Oxidation Amount in Region within 100 μm Directly Below Coating Layer>

The internal oxidation amount was measured by an "impulse furnace fusion-infrared absorption method." It is necessary to subtract the amount of oxygen contained in the untreated material (i.e., a steel sheet before annealing). Therefore, in the present invention, opposite surfaces of a high-tensile steel sheet after annealing were polished by 100 μm or more, and the concentration of oxygen in the steel was measured at positions on the polished surfaces. The measured value was used as the oxygen amount OH in the untreated material. The concentration of oxygen in the steel was measured on a section of the high-tensile steel sheet after annealing along its entire length in the thickness direction, and the measured value was used as an oxygen amount OI after internal oxidation. The thus-obtained oxygen amount OI in the high-tensile steel sheet after internal oxidation and the oxygen amount OH in the untreated material obtained were used to compute the difference between the OI and OH (=OI–OH), and a value converted to an amount per unit area (i.e., 1 m²) per side, (g/m²), was used as the internal oxidation amount.

The results obtained as above and the production conditions are shown in Tables 2 and 3.

TABLE 2

| | Steel | | | | Conditions in annealing furnace | | | | | | | | | | | | | | | | | |
|---|---|---|---|---|---|---|---|---|---|---|---|---|---|---|---|---|---|---|---|---|---|---|---|
| No. | Symbol | Si (mass %) | Mn (mass %) | Steel sheet | Heating rate (°C/sec.) in range of from 450°C to A°C | A (°C) | Dew point (°C) in range of from 600 to 750°C | Maximum steel sheet temperature (°C) | Transit time (min) of steel sheet in range of from 600°C to 750°C | Alloying temperature (°C) | Amount of internal oxidation (g/m²) | Coating weight (g/m²) | Type of coating | Fe content in coating layer (mass %) | Coating appearance | Corrosion resistance | Coating delamination resistance | TS (Mpa) | El (%) | TS × EL | Formability | Remarks |
| 1 | A | 0.03 | 4.5 | cold rolled | 1 | 575 | −47 | 650 | 1.5 | 500 | 0.006 | 50 | GA | 10 | C | C | C | 1076 | 24.1 | 25932 | good | ComparativeExample |
| 2 | A | 0.03 | 4.5 | cold rolled | 3 | 575 | −47 | 650 | 1.5 | 500 | 0.006 | 50 | GA | 10 | C | C | A | 1075 | 24.6 | 26445 | good | ComparativeExample |
| 3 | A | 0.03 | 4.5 | cold rolled | 5 | 575 | −47 | 650 | 1.5 | 500 | 0.005 | 50 | GA | 10 | C | A | A | 1077 | 24.4 | 26279 | good | ComparativeExample |
| 4 | A | 0.03 | 4.5 | cold rolled | 7 | 575 | −47 | 650 | 1.5 | 500 | 0.005 | 50 | GA | 10 | A | A | A | 1075 | 24.8 | 26660 | good | Inventive Example |
| 5 | A | 0.03 | 4.5 | cold rolled | 10 | 575 | −47 | 650 | 1.5 | 500 | 0.004 | 50 | GA | 10 | A | A | A | 1077 | 24.6 | 26494 | good | Inventive Example |
| 6 | A | 0.03 | 4.5 | cold rolled | 20 | 575 | −47 | 650 | 1.5 | 500 | 0.003 | 50 | GA | 10 | A | A | A | 1076 | 24.3 | 26147 | good | Inventive Example |
| 7 | A | 0.03 | 4.5 | cold rolled | 40 | 575 | −47 | 650 | 1.5 | 500 | 0.003 | 50 | GA | 10 | A | A | A | 1075 | 24.7 | 26553 | good | Inventive Example |
| 8 | A | 0.03 | 4.5 | cold rolled | 100 | 575 | −47 | 650 | 1.5 | 500 | 0.002 | 50 | GA | 10 | C | C | C | 1073 | 24.5 | 26289 | good | ComparativeExample |
| 9 | A | 0.03 | 4.5 | cold rolled | 10 | 460 | −47 | 650 | 1.5 | 500 | 0.004 | 50 | GA | 10 | C | C | C | 1077 | 24.0 | 25848 | good | ComparativeExample |
| 10 | A | 0.03 | 4.5 | cold rolled | 10 | 490 | −47 | 650 | 1.5 | 500 | 0.003 | 50 | GA | 10 | A | A | A | 1074 | 25.0 | 26850 | good | Inventive Example |
| 11 | A | 0.03 | 4.5 | cold rolled | 10 | 500 | −47 | 650 | 1.5 | 500 | 0.004 | 50 | GA | 10 | A | A | A | 1071 | 24.6 | 26347 | good | Inventive Example |
| 12 | A | 0.03 | 4.5 | cold rolled | 10 | 550 | −47 | 650 | 1.5 | 500 | 0.004 | 50 | GA | 10 | A | A | A | 1076 | 24.1 | 25932 | good | Inventive Example |
| 13 | A | 0.03 | 4.5 | cold rolled | 10 | 600 | −47 | 650 | 1.5 | 500 | 0.003 | 50 | GA | 10 | A | A | A | 1079 | 24.8 | 26759 | good | Inventive Example |
| 14 | A | 0.03 | 4.5 | cold rolled | 10 | 575 | −30 | 650 | 1.5 | 500 | 0.034 | 50 | GA | 10 | C | C | C | 1075 | 24.7 | 26553 | good | ComparativeExample |
| 15 | A | 0.03 | 4.5 | cold rolled | 10 | 575 | −37 | 650 | 1.5 | 500 | 0.022 | 50 | GA | 10 | A | A | A | 1077 | 24.9 | 26817 | good | Inventive Example |
| 16 | A | 0.03 | 4.5 | cold rolled | 10 | 575 | −44 | 650 | 1.5 | 500 | 0.010 | 50 | GA | 10 | A | A | A | 1076 | 24.1 | 25932 | good | Inventive Example |
| 17 | A | 0.03 | 4.5 | cold rolled | 10 | 575 | −45 | 650 | 1.5 | 500 | 0.004 | 50 | GA | 10 | A | A | A | 1079 | 24.9 | 26867 | good | Inventive Example |
| 18 | A | 0.03 | 4.5 | cold rolled | 10 | 575 | −47 | 650 | 1.5 | 500 | 0.004 | 50 | GA | 10 | A | A | A | 1080 | 25.1 | 27108 | good | Inventive Example |
| 19 | A | 0.03 | 4.5 | cold rolled | 10 | 575 | −50 | 650 | 1.5 | 500 | 0.004 | 50 | GA | 10 | A | A | A | 1074 | 24.8 | 26635 | good | Inventive Example |
| 20 | A | 0.03 | 4.5 | cold rolled | 10 | 550 | −47 | 550 | 1.5 | 500 | 0.005 | 50 | GA | 10 | A | A | A | 974 | 24.6 | 23960 | poor | ComparativeExample |
| 21 | A | 0.03 | 4.5 | cold rolled | 10 | 575 | −47 | 590 | 1.5 | 500 | 0.004 | 50 | GA | 10 | A | A | A | 1021 | 23.4 | 23891 | poor | ComparativeExample |
| 22 | A | 0.03 | 4.5 | cold rolled | 10 | 575 | −47 | 600 | 1.5 | 500 | 0.003 | 50 | GA | 10 | A | A | A | 1042 | 24.3 | 25321 | good | Inventive Example |
| 23 | A | 0.03 | 4.5 | cold rolled | 10 | 575 | −47 | 700 | 1.5 | 500 | 0.004 | 50 | GA | 10 | A | A | A | 1132 | 23.8 | 26942 | good | Inventive Example |
| 24 | A | 0.03 | 4.5 | cold rolled | 10 | 575 | −47 | 750 | 1.5 | 500 | 0.004 | 50 | GA | 10 | A | A | A | 1196 | 23.0 | 27508 | good | Inventive Example |
| 25 | A | 0.03 | 4.5 | cold rolled | 10 | 575 | −47 | 760 | 1.5 | 500 | 0.003 | 50 | GA | 10 | C | A | A | 1264 | 22.0 | 27808 | good | ComparativeExample |
| 26 | A | 0.03 | 4.5 | cold rolled | 10 | 575 | −47 | 650 | 0.2 | 500 | 0.003 | 50 | GA | 10 | A | A | A | 993 | 24.0 | 23832 | poor | ComparativeExample |
| 27 | A | 0.03 | 4.5 | cold rolled | 10 | 575 | −47 | 650 | 0.4 | 500 | 0.005 | 50 | GA | 10 | A | A | A | 1022 | 23.4 | 23915 | poor | ComparativeExample |
| 28 | A | 0.03 | 4.5 | cold rolled | 10 | 575 | −47 | 650 | 0.5 | 500 | 0.005 | 50 | GA | 10 | A | A | A | 1043 | 24.6 | 25658 | good | Inventive Example |
| 29 | A | 0.03 | 4.5 | cold rolled | 10 | 575 | −47 | 650 | 1.0 | 500 | 0.005 | 50 | GA | 10 | A | A | A | 1060 | 23.9 | 25334 | good | Inventive Example |
| 30 | A | 0.03 | 4.5 | cold rolled | 10 | 575 | −47 | 650 | 10.0 | 500 | 0.003 | 50 | GA | 10 | A | A | A | 1253 | 21.5 | 26940 | good | Inventive Example |
| 31 | A | 0.03 | 4.5 | hot-rolled | 10 | 575 | −47 | 650 | 1.5 | not alloyed | 0.004 | 50 | GI | 1 | A | A | A | 1076 | 24.9 | 26792 | good | Inventive Example |
| 32 | A | 0.03 | 4.5 | hot-rolled | 10 | 575 | −47 | 650 | 1.5 | 500 | 0.004 | 50 | GA | 10 | A | A | A | 1078 | 24.5 | 26411 | good | Inventive Example |
| 33 | A | 0.03 | 4.5 | cold rolled | 10 | 575 | −47 | 650 | 1.5 | not alloyed | 0.003 | 50 | GI | 1 | A | A | A | 1082 | 24.6 | 26617 | good | Inventive Example |

TABLE 2-continued

| | Steel | | | Conditions in annealing furnace | | | | | | | Amount of internal oxidation (g/m²) | Coating weight (g/m²) | Type of coating | Fe content in coating layer (mass %) | Coating appearance | Corrosion resistance | Coating delamination resistance | TS (Mpa) | El (%) | TS × EL | Formability | Remarks |
|---|---|---|---|---|---|---|---|---|---|---|---|---|---|---|---|---|---|---|---|---|---|---|
| | | Si (mass %) | Mn (mass %) | Steel sheet | Heating rate (°C/sec.) in range of from 450°C to A°C. | A (°C.) | Dew point (°C.) in range of from 600° to 750° C. | Maximum steel sheet temperature (°C.) | Transit time (min) of steel sheet in range of from 600° C. to 750° C. | Albying temperature (°C.) | | | | | | | | | | | | |
| Symbol No. | | | | | | | | | | | | | | | | | | | | | | |
| 34 | A | 0.03 | 4.5 | cold rolled | 10 | 575 | −47 | 650 | 1.5 | 460 | 0.004 | 50 | GA | 8 | A | A | A | 1070 | 24.1 | 25787 | good | Inventive Example |
| 35 | A | 0.03 | 4.5 | cold rolled | 10 | 575 | −47 | 650 | 1.5 | 550 | 0.005 | 50 | GA | 13 | A | A | A | 1074 | 24.2 | 25991 | good | Inventive Example |

Underlined items indicate production conditions outside the scope of the present invention
GA: High-strength hot-dipped galvannealed steel sheet
GI: High-strength hot-dipped galvanized steel sheet

US 10,301,701 B2

TABLE 3

| | Steel | | | | Conditions in annealing furnace | | | | | | | | | | | | | | | |
|---|---|---|---|---|---|---|---|---|---|---|---|---|---|---|---|---|---|---|---|---|
| | | Si (mass %) | Mn (mass %) | Steel sheet | Heating rate (°C/sec) in range of from 450°C to A°C | A (°C) | Dew point (°C) in range of from 600 to 750°C | Maximum steel sheet temperature (°C) | Transit time (min) of steel sheet in range of from 600°C to 750°C | Albying temperature (°C) | Amount of internal oxidation (g/m²) | Coating weight (g/m²) | Type of coating | Fe content in coating layer (mass %) | Coating appearance | Corrosion resistance | Coating delamination resistance | TS (Mpa) | El (%) | TS × EL | Remarks |
| No. | Symbol | | | | | | | | | | | | | | | | | | | | |
| 36 | A | 0.03 | 4.5 | cold rolled | 10 | 575 | −47 | 650 | 1.5 | 500 | 0.006 | <u>17</u> | GA | 10 | A | C | A | 1081 | 24.7 | 26701 | <u>Comparative Example</u> |
| 37 | A | 0.03 | 4.5 | cold rolled | 10 | 575 | −47 | 650 | 1.5 | 500 | 0.005 | 20 | GA | 10 | A | A | A | 1082 | 24.6 | 26617 | Inventive Example |
| 38 | A | 0.03 | 4.5 | cold rolled | 10 | 575 | −47 | 650 | 1.5 | 500 | 0.004 | 90 | GA | 10 | A | A | A | 1080 | 24.1 | 26028 | Inventive Example |
| 39 | A | 0.03 | 4.5 | cold rolled | 10 | 575 | −47 | 650 | 1.5 | 500 | 0.005 | 120 | GA | 10 | A | A | A | 1079 | 24.0 | 25896 | Inventive Example |
| 40 | A | 0.03 | 4.6 | cold rolled | 10 | 575 | −47 | 650 | 1.5 | 500 | 0.004 | <u>130</u> | GA | 10 | A | A | C | 1074 | 24.6 | 26420 | <u>Comparative Example</u> |
| 41 | B | 0.03 | 4.7 | cold rolled | 10 | 575 | −47 | 650 | 1.5 | 500 | 0.004 | 50 | GA | 10 | A | A | A | 1075 | 24.5 | 26338 | Inventive Example |
| 42 | C | 0.03 | 4.5 | cold rolled | 10 | 575 | −47 | 650 | 1.5 | 500 | 0.004 | 50 | GA | 10 | A | A | A | 1077 | 24.8 | 26710 | Inventive Example |
| 43 | D | 0.03 | 4.7 | cold rolled | 10 | 575 | −47 | 650 | 1.5 | 500 | 0.006 | 50 | GA | 10 | A | A | A | 1078 | 24.1 | 25980 | Inventive Example |
| 44 | E | 0.10 | 4.7 | cold rolled | 10 | 575 | −47 | 650 | 1.5 | 500 | 0.005 | 50 | GA | 10 | A | A | A | 1071 | 24.0 | 25704 | Inventive Example |
| 45 | F | 0.30 | 4.6 | cold rolled | 10 | 575 | −47 | 650 | 1.5 | 500 | 0.004 | 50 | GA | 10 | A | A | A | 1081 | 23.8 | 25728 | Inventive Example |
| 46 | G | 0.50 | 3.6 | cold rolled | 10 | 575 | −47 | 650 | 1.5 | 500 | 0.003 | 50 | GA | 10 | A | A | A | 1082 | 23.6 | 25535 | Inventive Example |
| 47 | H | 0.03 | 6.3 | cold rolled | 10 | 575 | −47 | 650 | 1.5 | 500 | 0.005 | 50 | GA | 10 | A | A | A | 1079 | 23.9 | 25788 | Inventive Example |
| 48 | I | 0.03 | 8.0 | cold rolled | 10 | 575 | −47 | 650 | 1.5 | 500 | 0.005 | 50 | GA | 10 | A | A | A | 1080 | 23.5 | 25380 | Inventive Example |
| 49 | J | 0.03 | 4.5 | cold rolled | 10 | 575 | −47 | 650 | 1.5 | 500 | 0.005 | 50 | GA | 10 | A | A | A | 1076 | 23.9 | 25716 | Inventive Example |
| 50 | K | 0.03 | 4.6 | cold rolled | 10 | 575 | −47 | 650 | 1.5 | 500 | 0.004 | 50 | GA | 10 | A | A | A | 1077 | 24.0 | 25848 | Inventive Example |
| 51 | L | 0.03 | 4.7 | cold rolled | 10 | 575 | −47 | 650 | 1.5 | 500 | 0.005 | 50 | GA | 10 | A | A | A | 1080 | 23.5 | 25380 | Inventive Example |
| 52 | M | 0.03 | 4.5 | cold rolled | 10 | 575 | −47 | 650 | 1.5 | 500 | 0.004 | 50 | GA | 10 | A | A | A | 1083 | 23.4 | 25342 | Inventive Example |
| 53 | N | 0.02 | 4.7 | cold rolled | 10 | 575 | −47 | 650 | 1.5 | 500 | 0.003 | 50 | GA | 10 | A | A | A | 1081 | 23.3 | 25187 | Inventive Example |
| 54 | O | 0.03 | 4.6 | cold rolled | 10 | 575 | −47 | 650 | 1.5 | 500 | 0.004 | 50 | GA | 10 | A | A | A | 1081 | 23.2 | 25079 | Inventive Example |
| 55 | P | 0.03 | 4.5 | cold rolled | 10 | 575 | −47 | 650 | 1.5 | 500 | 0.004 | 50 | GA | 10 | A | A | A | 1076 | 24.0 | 25824 | Inventive Example |
| 56 | Q | 0.02 | 4.7 | cold rolled | 10 | 575 | −47 | 650 | 1.5 | 500 | 0.005 | 50 | GA | 10 | A | A | A | 1078 | 24.1 | 25980 | Inventive Example |
| 57 | R | 0.03 | 4.5 | cold rolled | 10 | 575 | −47 | 650 | 1.5 | 500 | 0.005 | 50 | GA | 10 | A | A | A | 1071 | 24.1 | 25811 | Inventive Example |
| 58 | S | 0.03 | 4.5 | cold rolled | 10 | 575 | −47 | 650 | 1.5 | 500 | 0.004 | 50 | GA | 10 | A | A | A | 1080 | 24.0 | 25920 | Inventive Example |
| 59 | T | 0.02 | 4.7 | cold rolled | 10 | 575 | −47 | 650 | 1.5 | 500 | 0.005 | 50 | GA | 10 | A | A | A | 1081 | 24.6 | 26593 | Inventive Example |
| 60 | U | 0.03 | 4.6 | cold rolled | 10 | 575 | −47 | 650 | 1.5 | 500 | 0.005 | 50 | GA | 10 | A | A | A | 1076 | 24.9 | 26792 | Inventive Example |
| 61 | V | 0.02 | 4.5 | cold rolled | 10 | 575 | −47 | 650 | 1.5 | 500 | 0.004 | 50 | GA | 10 | A | A | A | 1072 | 23.9 | 25621 | Inventive Example |
| 62 | W | 0.03 | 4.5 | cold rolled | 10 | 575 | −47 | 650 | 1.5 | 500 | 0.004 | 50 | GA | 10 | A | A | A | 1079 | 24.5 | 26436 | Inventive Example |
| 63 | X | 0.02 | 4.4 | cold rolled | 10 | 575 | −47 | 650 | 1.5 | 500 | 0.005 | 50 | GA | 10 | A | A | A | 1085 | 24.3 | 26366 | Inventive Example |
| 64 | Y | 0.03 | 4.5 | cold rolled | 10 | 575 | −47 | 650 | 1.5 | 500 | 0.005 | 50 | GA | 10 | A | A | A | 1081 | 24.4 | 26376 | Inventive Example |
| 65 | Z | 0.02 | 4.7 | cold rolled | 10 | 575 | −47 | 650 | 1.5 | 500 | 0.004 | 50 | GA | 10 | A | A | A | 1082 | 24.5 | 26509 | Inventive Example |
| 66 | <u>XA</u> | 0.02 | 4.6 | cold rolled | 10 | 575 | −47 | 650 | 1.5 | 500 | 0.004 | 50 | GA | 10 | A | A | A | 772 | 30.2 | 23314 | <u>Comparative Example</u> |
| 67 | <u>XB</u> | 0.03 | 4.7 | cold rolled | 10 | 575 | −47 | 650 | 1.5 | 500 | 0.005 | 50 | GA | 10 | A | A | A | 1522 | 15.2 | 23134 | <u>Comparative Example</u> |
| 68 | <u>XC</u> | <u>0.60</u> | 4.5 | cold rolled | 10 | 575 | −47 | 650 | 1.5 | 500 | 0.004 | 50 | GA | 10 | C | A | C | 1077 | 24.9 | 26817 | <u>Comparative Example</u> |
| 69 | <u>XD</u> | 0.03 | <u>3.5</u> | cold rolled | 10 | 575 | −47 | 650 | 1.5 | 500 | 0.006 | 50 | GA | 10 | A | A | C | 1081 | 21.6 | 23350 | <u>Comparative Example</u> |
| 70 | <u>XE</u> | 0.03 | 4.6 | cold rolled | 10 | 575 | −47 | 650 | 1.5 | 500 | 0.004 | 50 | GA | 10 | A | A | A | 1074 | 23.6 | 25346 | <u>Comparative Example</u> |

Formability: good/good/good/good/good/good/good/good/good/good/good/good/good/good/good/good/good/good/good/good/good/good/good/good/good/good/good/good/good/good/poor/poor/good/poor/good TABLE 3-continued

| | Steel | | | | Conditions in annealing furnace | | | | | | | Amount of internal oxidation (g/m²) | Coating weight (g/m²) | Type of coating | Fe content in coating layer (mass %) | Coating appearance | Corrosion resistance | Coating delamination resistance | TS (Mpa) | El (%) | TS × EL | Formability | Remarks |
|---|---|---|---|---|---|---|---|---|---|---|---|---|---|---|---|---|---|---|---|---|---|---|---|
| No. | Symbol | Si (mass %) | Mn (mass %) | Steel sheet | Heating rate (°C/sec.) in range of from 450°C to A°C. | A (°C) | Dew point (°C) in range of from 600° to 750°C | Maximum steel sheet temperature (°C) | Transit time (min) of steel sheet in range of from 600° C. to 750° C. | Albying | temperature (°C) | | | | | | | | | | | | |
| 71 | XF | 0.02 | 4.5 | cold rolled | 10 | 575 | −47 | 650 | 1.5 | 500 | 0.005 | 50 | GA | 10 | C | A | C | 1044 | 21.0 | 21924 | poor | Comparative Example |
| 72 | XG | 0.02 | 4.7 | cold rolled | 10 | 575 | −47 | 650 | 1.5 | 500 | 0.006 | 50 | GA | 10 | A | A | A | 1058 | 20.3 | 21477 | poor | Comparative Example |

Underlined items indicate production conditions outside the scope of the present invention
GA: High-strength hot-dipped galvannealed steel sheet
GI: High-strength hot-dipped galvanized steel sheet As is clear from Tables 2 and 3, although the GIs and GAs (Inventive Examples) produced by the method of the present invention contain large amounts of easily oxidizable elements such as Si and Mn and are high-strength steel sheets, they have good corrosion resistance, good formability during severe forming, good resistance to coating delamination during severe forming, and good coating appearance. However, in Comparative Examples, at least one of coating appearance, corrosion resistance, formability during severe forming, and resistance to coating delamination during severe forming is poor.

The high-strength hot-dip galvanized steel sheet of the present invention is excellent in coating appearance, corrosion resistance, formability, and resistance to coating delamination during severe forming and can be used as a surface-treated steel sheet for reducing the weight of the body itself of an automobile and strengthening the body. The high-strength hot-dip galvanized steel sheet can also be used as a surface-treated steel sheet produced by imparting anti-corrosiveness to a base steel sheet in various fields other than automobiles such as the fields of home appliances and construction materials.

The invention claimed is:

1. A method for producing a high-strength hot-dip galvanized steel sheet including a steel sheet and a galvanized coating layer formed on the surface of the steel sheet with a coating weight of 20 to 120 g/m² per side of the steel sheet, the galvanized coating layer being formed after annealing of the steel sheet, the steel sheet containing, by mass %, C: 0.03 to 0.35%, Si: 0.01 to 0.50%, Mn: 3.6 to 8.0%, Al: 0.001 to 1.000%, P: 0.10% or less, and S: 0.010% or less, with the balance being Fe and unavoidable impurities, the method comprising:
subjecting the steel sheet to annealing in a continuous galvanizing line,
wherein, in a heating process for the annealing, a rate of temperature rise of the steel sheet, when temperature of the steel sheet inside an annealing furnace is in a temperature range of from 450° C. to A° C. inclusive (where A is an arbitrary value selected in a range of 500≤A), is 7° C./sec. or more,
wherein maximum steel sheet temperature reached during the annealing is 600° C. or higher and 750° C. or lower, and
wherein, when the temperature of the steel sheet is in a temperature range of from 600° C. to 750° C. inclusive during the annealing, a transit time of the steel sheet in the temperature range of from 600° C. to 750° C. inclusive is 30 seconds or longer and 10 minutes or shorter, and the dew point of an atmosphere is −45° C. or lower; and then
subjecting the steel sheet subjected to the annealing to hot-dip galvanizing treatment.

2. The method for producing a high-strength hot-dip galvanized steel sheet according to claim 1, wherein the steel sheet further contains in a chemical composition thereof, by mass %, at least one element selected from B: 0.001 to 0.005%, Nb: 0.005 to 0.050%, Ti: 0.005 to 0.050%, Cr: 0.001 to 1.000%, Mo: 0.05 to 1.00%, Cu: 0.05 to 1.00%, Ni: 0.05 to 1.00%, Sn: 0.001 to 0.20%, Sb: 0.001 to 0.20%, Ta: 0.001 to 0.10%, W: 0.001 to 0.10%, and V: 0.001 to 0.10%.

3. The method for producing a high-strength hot-dip galvanized steel sheet according to claim 1, further comprising, after the hot-dip galvanizing treatment, subjecting the steel sheet to alloying treatment by heating the steel sheet to a temperature of 450° C. or higher and 600° C. or lower to adjust the content of Fe in the coating layer within a range of 8 to 14% by mass.

4. A high-strength hot-dip galvanized steel sheet produced by the method for producing a high-strength hot-dip galvanized steel sheet according to claim 1, comprising:
a base steel sheet and the galvanized coating layer formed on the base steel sheet,
wherein the base steel sheet has the chemical composition according to claim 1, and
the total amount of at least one oxide selected from Fe, Si, Mn, Al, P, B, Nb, Ti, Cr, Mo, Cu, Ni, Sn, Sb, Ta, W, and V oxides (excluding the case where the at least one oxide includes only Fe oxides) that is present in a region within 100 μm from a surface of the base steel sheet and immediately below the galvanized coating layer is less than 0.010 g/m² per side of the base steel sheet.

5. The method for producing a high-strength hot-dip galvanized steel sheet according to claim 2, further comprising, after the hot-dip galvanizing treatment, subjecting the steel sheet to alloying treatment by heating the steel sheet to a temperature of 450° C. or higher and 600° C. or lower to adjust the content of Fe in the coating layer within a range of 8 to 14% by mass.

6. A high-strength hot-dip galvanized steel sheet produced by the method for producing a high-strength hot-dip galvanized steel sheet according to claim 2, comprising:
a base steel sheet and the galvanized coating layer formed on the base steel sheet,
wherein the base steel sheet has the chemical composition according to claim 2, and
the total amount of at least one oxide selected from Fe, Si, Mn, Al, P, B, Nb, Ti, Cr, Mo, Cu, Ni, Sn, Sb, Ta, W, and V oxides (excluding the case where the at least one oxide includes only Fe oxides) that is present in a region within 100 μm from a surface of the base steel sheet and immediately below the galvanized coating layer is less than 0.010 g/m² per side of the base steel sheet.

* * * * *